United States Patent [19]

Schad et al.

[11] Patent Number: 4,863,369
[45] Date of Patent: Sep. 5, 1989

[54] INJECTION MOLDING WITH SHOOTING POTS

[75] Inventors: Robert D. Schad, Toronto; Paul P. Brown, Orangeville, both of Canada

[73] Assignee: Husky Injection Molding Systems Ltd., Bolton, Canada

[21] Appl. No.: 115,399

[22] Filed: Nov. 2, 1987

Related U.S. Application Data

[63] Continuation-in-part of Ser. No. 862,269, May 12, 1986, Pat. No. 4,717,324.

[51] Int. Cl.⁴ ............................................. B29C 45/02
[52] U.S. Cl. .................................... 425/547; 425/557; 425/558; 425/560; 425/572; 425/588
[58] Field of Search ............... 425/547, 557, 558, 559, 425/560, 561, 572, 588

[56] References Cited

U.S. PATENT DOCUMENTS 4,080,147 6/1978 Dumortier ....................... 425/551
4,389,358 6/1983 Hendry ............................ 425/572

FOREIGN PATENT DOCUMENTS 212926 12/1983 Japan .................................. 425/588

Primary Examiner—Jay H. Woo
Assistant Examiner—Timothy W. Heitbrink
Attorney, Agent, or Firm—Bachman & LaPointe

[57] ABSTRACT

A multi-cavity mold in combination with a hot runner system wherein the hot runner system includes metering means individual to each mold cavity for feeding precisely measured quantities of thermoplastic material to each cavity.

13 Claims, 1 Drawing Sheet

4,863,369

INJECTION MOLDING WITH SHOOTING POTS

CROSS-REFERENCE TO RELATED APPLICATIONS

This application is a Continuation-In-Part of copending U.S. Pat. Application Ser. No. 862,269 now U.S. Pat. No. 4,717,324 Coinjection Of Hollow Articles and Preforms, By Robert D. Schad and Paul P. Brown, filed May 12, 1986.

FIELD OF THE INVENTION

The invention relates to precise control of injection molding compound being introduced to a multi-cavity mold. More specifically the invention relates to a control or metering apparatus and a metering method that is individual to each cavity.

The invention also relates to adjustment of the metering or control unit on an individual cavity basis. For example, where a single source of one resin is being supplied simultaneously to a plurality of mold cavities provision is made to adjust the flow of molding compound to one cavity, individually, without disturbing the meter setting in the remaining cavities.

BACKGROUND OF THE INVENTION

The use of control units such as shooting pots to introduce thermoplastic resin into single cavity molds is well known. In such arrangements a primary resin source feeds the reservoir of a shooting pot and the shooting pot, in turn, is operated to feed a measured or metered quantity of compound into a single cavity mold to form large items such as buckets, trash containers and like receptacles.

In contrast, the present invention is directed to the concept of supplying thermoplastic molding compound to a multi-cavity mold there the cavities of the mold are fed by a hot runner system where the hot runner system includes hooting pots (metering means or control units) which are individual to each cavity. That is, conduits that lead from the hot runner system to feed the respective mold cavities each contain a shooting pot or metering means for controlling precisely the introduction of a single shot of compound to a mating cavity on an individual or cavity by cavity basis.

The hot runner system is supplied or fed with thermoplastic material from a primary source usually in the form of an extruder or similar device in well known fashion.

For purposes of claiming the present invention, the shooting pots are referred to as metering means or as secondary compound advancing units.

It is a primary feature of the present invention to provide a hot runner system cooperating with a multi-cavity mold where the hot runner system includes metering means individual to each mold cavity.

It is a further feature of the invention to provide metering means in the hot runner system which are operable to feed precisely measured quantities of compound to each cavity.

It is a further feature of the invention to provide metering means individual to each cavity where the metering means are adjustable to change volume, for example, on a cavity by cavity basis. That is, each metering means may be adjusted individually without disabling the setting, function and operation of the other metering means in the hot runner system.

A further feature of the invention is the treatment of a multi-cavity mold and a hot runner system as a unitary assembly.

A still further feature of the invention is the provision of a novel process for feeding, metering and adjusting the introduction of thermoplastic compound into individual cavities of a multi-cavity mold by incorporating the feeding, metering and adjusting steps into a hot runner system.

An arrangement embracing certain features of the present invention may comprise, in combination, a multi-cavity mold and a hot runner system, supply means incorporated in the hot runner system for feeding measured quantities of thermoplastic compound to each said mold cavity on an individual cavity basis.

A method embracing certain other features of the present invention may comprise the steps of providing a mold having a plurality of cavities, providing a hot runner system for feeding said cavities, connecting the hot runner system to each cavity by means of compound conduits individual to each cavity and placing metering means in each said cavity conduit for controlling the introduction of compound to each cavity on an individual cavity basis.

Other feature and advantages of the present invention will become more apparent from an examination of the succeeding specification when read in conjunction with the a pended drawings in which;

DETAILED DESCRIPTION OF PREFERRED EMBODIMENT

Figure 1:
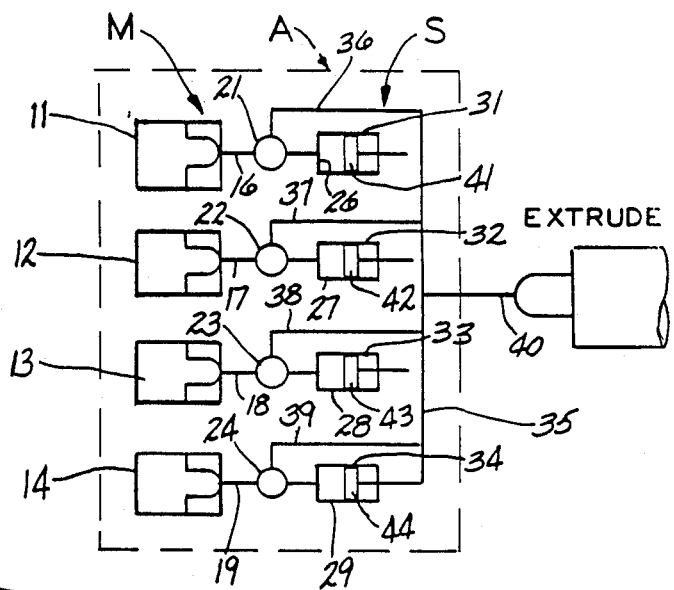
FIG. 1 shows, schematically, a hot runner system and a multi-cavity mold where the hot runner system includes metering means individual to each mold cavity; and, FIG. 2 is a detailed sectional view of a typical metering means within the hot runner system.

In FIG. 1 an assembly A within the dashed lines includes a multi-cavity mold M in combination with a hot runner system S with an external primary thermoplastic compound feed unit defining an extruder. Mold cavities 11, 12, 13 and 14 are connected individually to the hot runner system by compound conduits 16, 17, 18 and 19, respectively.

The reference numerals 21, 22, 23 and 24 represent valves controlling the introduction of compound into reservoirs 26, 27, 28 and 29 of metering means or shooting pots 31, 32, 33 and 34.

Each valve is connected to manifold 35 by compound conduits 36, 37, 38 and 39 and the manifold is, in turn, supplied thermoplastic compound by a primary unit defining, in this embodiment of the invention, an extruder via conduit 40.

The metering means, in the disclosed embodiment, defines a piston-cylinder assembly where the stroke of each piston 41, 42, 43 and 44 is adjustable individually to change the volume of the reservoirs 26, 27, 28 and 29 (cylinder portion) to facilitate feeding (metering) precise quantities of compound to the mold cavities on a cavity by cavity basis.

Figure 2:
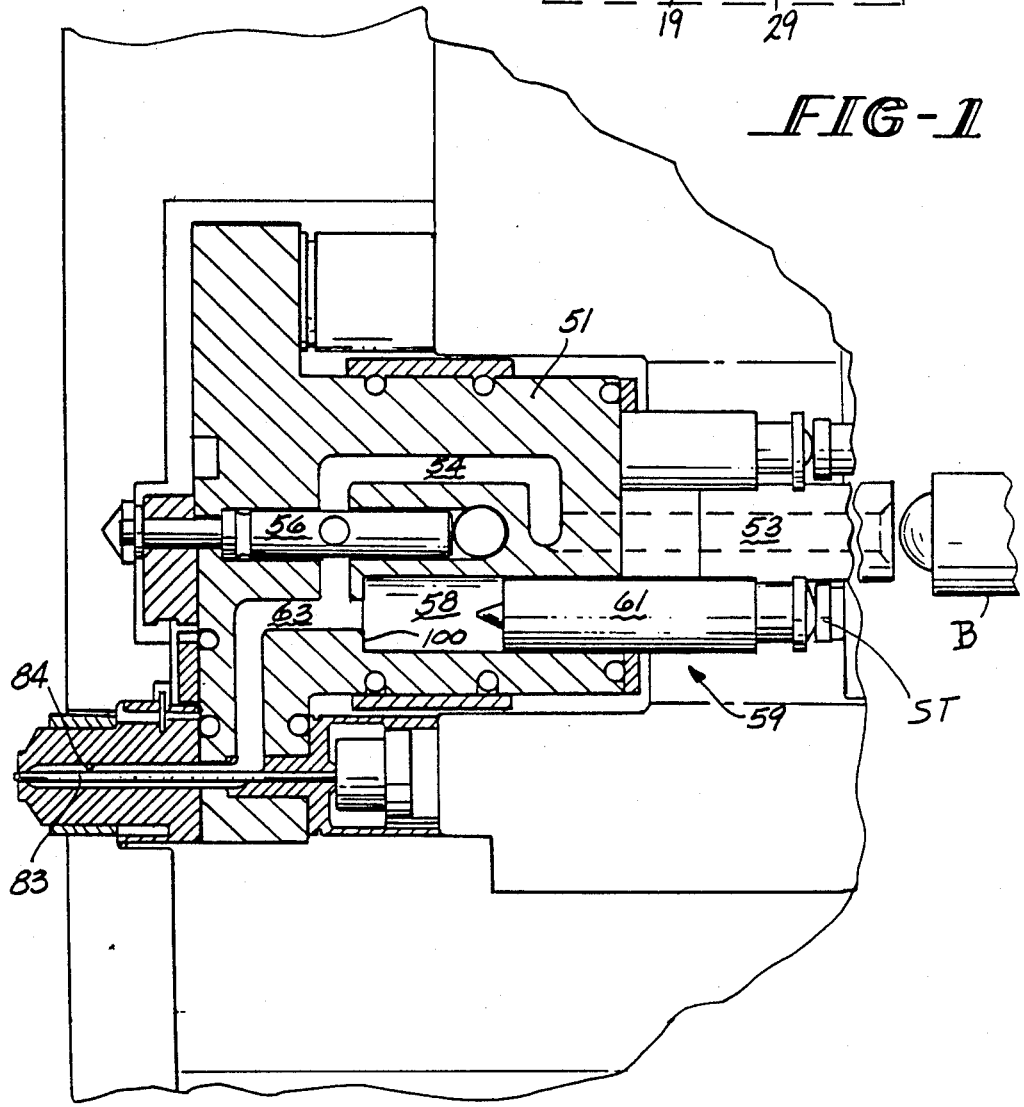

Referring to FIG. 2 details of a single metering means within the hot runner system will be described recognizing that each metering means within the hot runner system is of the same structure and operation.

Extruder B feeds thermoplastic compound through channels 53 and 54 of hot runner manifold block 51 and through valve 56 to charge reservoir 58 of metering means or shooting pot 59 in the manner described in said copending application Ser. No. 869,269 now U.S. Pat. No. 4,717,324.

As described further in the copending '269 application, when the reservoir 58 is fully charged with a precise amount of compound (corresponding to the volume of the reservoir) the valve 56 is closed and the nozzle stem 83 is opened. Next, the piston 61 is advanced until it bottoms at the point indicated by the reference numeral 100 advancing compound through conduit 63 and nozzle passage 84 into a mating mold cavity.

In this manner a precisely measured quantity of compound is advanced from the hot runner system to a mating mold cavity such as cavity 11 (FIG. 1).

After the measured charge of compound has been introduced into the mold cavity the stem 83 is moved to the closed position, valve 56 is opened and the reservoir is recharged by extruder B as described in said copending application SN 869,269 now U.S. Pat. No. 4,717,324.

During this occurrence the piston 61 is displaced by incoming compound until it contacts adjustable stop ST.

The stop ST is adjustable axially of the piston 61 to change the stroke of the piston 61 which, in turn, controls the volume of the reservoir. In this fashion, metering of compound is controlled precisely and individually from mold cavity to mold cavity.

As stated previously, the stroke of each piston 41 through 44 FIG. 1 is adjustable individually to change the volume of its mating reservoir without disturbing the setting (stroke) of the other pistons in a given plural piston configuration within a hot runner system.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In combination a multi-cavity mold, a hot runner system, an external primary compound supply means, and selectively adjustable secondary supply means incorporated internally in the hot runner system for feeding a single shot of moldable compound to each said mold cavity individually whereby said primary and secondary supply means cooperate via said hot runner system to mold a complete article at each cavity, said secondary supply means having adjustment means for changing the volume of said single shot of moldable compound, selectively and individually relative to each cavity.

2. The combination of claim 1 in which the mold and the hot runner system define a unitary assembly.

3. The combination of claim 1 in which the secondary means within the hot runner system defines a plurality of secondary supply units, one secondary unit being individual to each mold cavity.

4. The combination of claim 3 in which each secondary unit includes a compound reservoir.

5. The combination of claim 4 in which the compound reservoir is defined by a piston-cylinder assembly.

6. An apparatus for controlling precisely the injection of thermoplastic compound into a plurality of mold cavities comprising:

a plurality of mold cavities of precise configuration, volume and location, a primary unit for supplying and advancing thermoplastic compound, a hot runner system for distributing compound supplied by said primary unit, said hot runner system being disposed between the mold cavities and the primary unit, a plurality of secondary units for further advancing said compound, a secondary unit being individual to each mold cavity for advancing compound to respective mold cavity individually and selectively, each said secondary unit having means for adjusting the volume of compound advanced to each mold cavity independently and selectively, said secondary units being incorporated within said hot runner system and said primary unit being external of said hot runner system, said primary and secondary units being operable to complete a molding operation at each mold cavity location.

7. The apparatus of claim 6 in which each secondary unit includes a compound reservoir having a precisely measurable volume, said primary unit being operable to feed said reservoirs and each said secondary unit is operable, in turn, to feed precise quantities of said compound to the mold cavity individual thereto, filling said mold cavity precisely.

8. The apparatus of claim 6 in which each mold cavity is constructed and arranged so as to be operable to mold a finished product at each mold location.

9. In an injection molding machine of the type in which a multi-cavity mold and a hot runner system are incorporated internally in a manifold means, components of each cavity having a fixed location, the improvement comprising:

a primary compound supply means external of said manifold means, a plurality of secondary compound supply means within said manifold means, each said secondary supply means being individual to a mold cavity and to its components at each said location, said secondary supply means being connected operably to each mold cavity whereby compound supplied to said manifold means by said primary supply means is advanced to each mold cavity individually via said secondary supply means by single shot operation of said secondary supply means, said secondary supply means including adjustment means whereby compound advanced to individual mold cavities can be changed on a volumetric basis from mold cavity to mold cavity.

10. The injection molding machine of claim 9 in which each secondary supply means comprises a shooting pot.

11. The injection molding machine of claim 9 in which the secondary supply means is a metering means.

12. The injection molding machine of claim 11 including means for adjusting the metering means whereby compound advanced to individual mold cavities can be changed on a volumetric basis from mold cavity to mold cavity.

13. The injection molding machine of claim 9 including valve means in the hot runner system for disabling an individual secondary supply means without interrupting the function and operation of the remaining secondary supply means and their mating mold cavities.

* * * * *